United States Patent [19]

Grossmann et al.

[11] 4,342,931
[45] Aug. 3, 1982

[54] BRUSH-SHIFTING AND TRIGGER-SWITCH ARRANGEMENTS FOR A PORTABLE TOOL

[75] Inventors: Horst Grossmann, Huenfelden; Alfred Bausch, Waldbrunn, both of Fed. Rep. of Germany

[73] Assignee: Black & Decker Inc., Newark, Del.

[21] Appl. No.: 229,441

[22] Filed: Jan. 29, 1981

[51] Int. Cl.³ .................. B23B 45/02; H02K 7/14
[52] U.S. Cl. ............................. 310/50; 310/230; 200/50 C; 173/48
[58] Field of Search .......... 310/50, 68 A, 230, 241, 310/47, 68; 200/157, 330, 331, 50 C; 173/48

[56] References Cited
U.S. PATENT DOCUMENTS

2,764,705  9/1956  Albertson et al. .............. 310/68
3,440,465  4/1969  Pratt et al. .................... 310/230
4,204,580  5/1980  Nalley .......................... 173/48

Primary Examiner—J. D. Miller
Assistant Examiner—D. L. Rebsch
Attorney, Agent, or Firm—Walter Ottesen; Harold Weinstein; Edward D. Murphy

[57] ABSTRACT

A portable electric tool with a housing having a motor compartment and a pistol grip handle is provided with a trigger-switch, incorporating a motor reversing switch, mounted in the handle. An elongated lever is pivoted intermediate its length and contained within the housing. The rear end of the lever is connected to the reversing switch for actuation thereof. The forward end of the lever has a downwardly projecting protrusion which engages in a slide member which is slidable along an arcuate slot in the lower wall of the motor compartment for pivoting the lever. Intermediate the forward end of the lever and the pivotal axis of the lever is a downwardly projecting pin which coacts with a partition and two grooves in the upper part of the trigger-switch to block the movement of the trigger until the lever has been pivoted to actuate the reversing switch, and also to prevent pivoting of the lever while the trigger is in an inward position energizing the tool. A brush-board assembly is rotatably mounted in bearings extending inwardly from the wall of the motor compartment. The lever has adjacent its forward end an upwardly extending forked arm which engages a stud on the brush-board assembly to effect rotation thereof when the lever is pivoted.

24 Claims, 12 Drawing Figures

BRUSH-SHIFTING AND TRIGGER-SWITCH ARRANGEMENTS FOR A PORTABLE TOOL

FIELD OF THE INVENTION

The present invention relates to portable electric tools and more particularly to improvements in brush-shifting and switch arrangements therefor.

BACKGROUND OF THE INVENTION

In portable electric tools, for example, portable drills, screw drills and the like, it is desirable to reverse the direction of rotation of the motor to facilitate, for example, the loosening and removal of screws, or for rotating a thread-cutting tool out of a bore after cutting a thread therein. This is accomplished by reversing the polarity across the armature of the motor thereby changing the direction in which the current flows therethrough.

Trigger-switches for portable tools have been developed which perform this function. Such switches are constructed so that the reversal of polarity cannot occur until the switch has been completely opened. In one such trigger-switch arrangement which incorporates a reversing switch, the actuating lever of the reversing switch is disposed immediately above the trigger of the trigger-switch, and just below the motor compartment of the tool. The actuating lever of the reversing switch and the trigger are mechanically related so that the trigger remains inoperative, i.e., it cannot be moved, until the actuating lever is positioned to one side of the trigger to allow the motor to be energized to rotate in one direction, or until the actuating lever is positioned to the other side of the trigger to reverse the direction of rotation of the motor.

It is known that the mechanical neutral between the field coils of a motor does not necessarily coincide with the electrical neutral of the field generated by those coils when the armature is rotating. Such motors would provide optimum performance if the brushes engaging the armature's commutator are disposed on the electrical neutral, and it is for this reason that brushes in many motors are mounted in the motor housing so as to be offset from the mechanical neutral. When such a motor is operated in the opposite direction of rotation, the electrical neutral will shift to take on a position on the opposite side of the mechanical neutral. However, because the brushes have not been moved to the new electrical neutral, sparking and excessive brush and commutator wear will occur. In addition, the sparking action will cause electrical noise to be sent back into the power network supplying the electrical energy for the tool. Accordingly, to obtain optimum motor performance in the reverse direction of rotation, it is desirable to mechanically shift the brushes so that they can be located on the "reverse" electrical neutral on the opposite side of the mechanical neutral.

Arrangements such as that shown in U.S. Pat. No. 3,440,465 have been proposed for portable tools wherein the electrical switching operation to achieve rotation in the reverse direction is coordinated with the brush-shifting operation in such a manner that both operations occur in response to a single manual movement. However, these arrangements can be elaborate and require considerably electrical switching structure in the area of the commutator. In addition, a trigger-switch disposed at a location remote from the brush-shifting arrangement is still required to connect and disconnect electrical energy to the tool.

Another brush-shifting arrangement for a portable tool is disclosed in U.S. Pat. No. 2,764,705. This also incorporates an electrical switching mechanism to reverse the polarity of the motor. However, it also requires substantial structure in the area of the brushes and includes a mechanical interlock with the trigger-switch to ensure that the motor is not connected to the line voltage unless the brushes are in one of their two electrical neutral positions.

As indicated above, trigger-switches are known which incorporate a lever-actuated double-pole switch that can be wired to reverse the direction of current flow through the armature. Once the lever has been set, the operator can connect and disconnect electrical energy to the motor by operating the trigger-actuated switch by manually depressing the trigger.

The present invention is concerned with improving and further simplifying brush-shifting and reversing switch arrangements.

Accordingly, it is an object of the invention to provide a brush-shifting and trigger-switch arrangement for a portable electric tool wherein the brush-shifting mechanism is operatively coupled to the trigger-switch thereby making it unnecessary to provide an elaborate switching structure in the housing of the portable tool at the region of the brush-shifting mechanism.

It is a further object of the present invention to provide a brush-shifting and trigger-switch arrangement for a portable electric tool wherein the polarity of the lever-actuated reversing switch is determined by the angular position of the brushes with respect to the mechanical neutral plane of the motor, and wherein a manual shift of the brushes is prevented during the time that the trigger of the trigger-switch is depressed.

In the known combined trigger and reversing switches previously described, the lever of the lever actuated reversing switch is arranged outside the tool's housing. This brings with it at least two disadvantages to the operator. First, to accommodate the trigger-switch, openings are required to be formed in the housing of the portable tool wherein dirt and chippings can enter and cause the motor to malfunction; and, second, the lever requires considerable space which places the trigger of the trigger-switch a small, but some distance away from the main body of the tool housing, wherein the motor is mounted, causing the operator some discomfort when holding the tool and depressing the trigger with the index finger.

With regard to the second disadvantage mentioned above, a solution is suggested in U.S. Pat. No. 3,579,002 wherein the tool housing is provided with a small recess for accommodating the lever of the lever-actuated reversing switch.

The present invention is also concerned with improving combined trigger-switch and reversing switch arrangements.

Accordingly, it is, therefore, still a further object of the present invention to provide a trigger-switch arrangement for a portable tool which reduces or overcomes the two abovementioned disadvantages with known combinations of trigger and reversing switches.

SUMMARY OF THE INVENTION

Toward the accomplishment of the aforementioned objects and others which will become apparent from the following description and accompanying drawings, there is disclosed a portable tool having an electric motor with an armature and a rotatable brush-board. The brush-board has brushes mounted thereon, forming a brush-board assembly. A reversing switch determines the direction of rotation of the armature. A pivoted lever mechanically couples the brush-board to the reversing switch whereby pivotal movement of the lever angularly shifts the brushes about the axis of rotation of the armature and simultaneously actuates the reversing switch to determine the direction of rotation of the armature. A main switch, preferably a trigger-switch, is provided for energizing the tool, and the reversing switch can be housed with the main switch. The lever can be pivoted to the main switch. The electric motor is housed in a motor compartment, and at least one end of the lever is situated in the motor compartment where it is mechanically coupled to the brush-board assembly.

The lever is elongated and preferably disposed completely within the tool housing. The lever has stop means, such as a downwardly projecting protrustion, which engages and cooperates with the trigger of the trigger-switch in such a way that the lever can only be pivotally moved when the trigger-switch is not energizing the motor, i.e., when the trigger switch is in the off position. The trigger can have two grooves, separated by a partition, either of which can be engaged by the stop means when the lever is pivoted to one side or other of the trigger. Means, accessible from the exterior of the tool housing, is provided for actuating pivoting of the lever, for example, a slide member can be provided which slidably engages in an aperture in the tool housing, and is connected to the lever by a downwardly extending part of the lever engaging in a cavity in the slide member. The lever can be pivoted in the trigger-switch or in the tool housing, for example, above the trigger-switch. Preferably the lever is pivoted intermediate its ends about an axis which is substantially closer to the reversing switch than it is to the location at which the lever is coupled to the brush-board assembly. The lever has a member, for example, an upwardly extending forked arm, which engages a part, for example, a stud, of the brush-board assembly for rotation thereof.

Bearing members extend inwardly from the wall of the motor compartment and slidably engage the periphery of an annular board of the brush-board assembly whereby the brush-board assembly is rotatably mounted. Preferably, resilient means act upon the periphery of the annular board to urge it in a direction transversely to the axis of rotation of the armature to compensate for any tolerance variation between the periphery of the annular board and the bearing members.

There is also disclosed, according to another aspect of the invention, a portable tool having a housing which includes a handle and a compartment extending forwardly of the handle, which compartment has a lower wall with an aperture therein. A trigger-operated switch is housed in the handle for energizing the tool and has the trigger extending forwardly from the handle closely adjacent the lower wall of the compartment. An elongated pivoted lever, for actuating a function of the tool, such as brush-shifting and/or motor reversing, is arranged within the housing and has a stop member cooperating with the trigger whereby the lever can only be pivotally moved when the trigger-switch is in an off position to deenergize the tool. A reversing switch can conveniently be incroporated in the trigger-switch.

DETAILED DESCRIPTION OF THE PREFERRED EMBODIMENTS

Figures 1, 2:
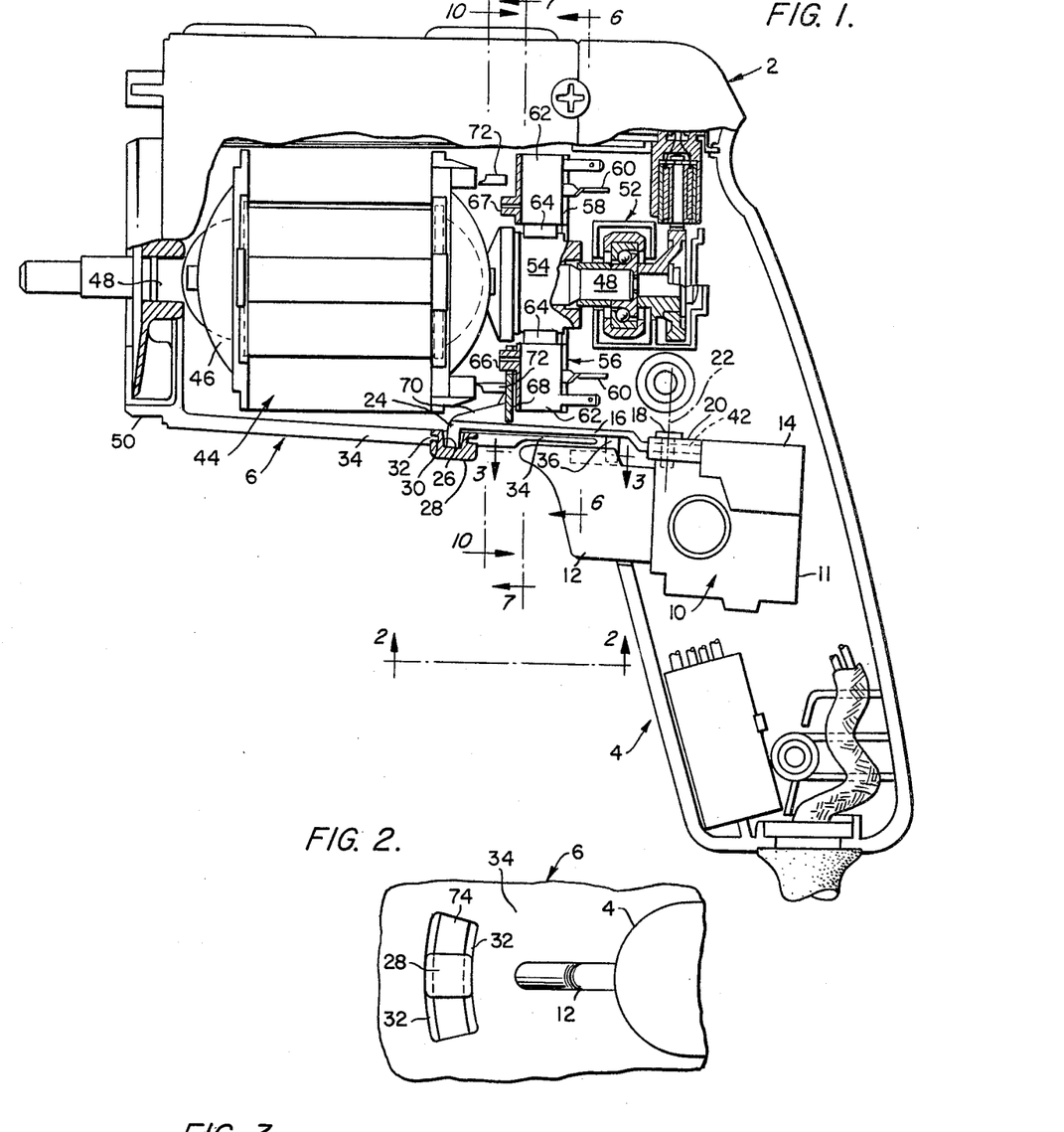
FIG. 1 is a diagrammatic vertical section of a portable tool according to the present invention.
FIG. 2 is an underneath view, taken on the line 2—2 in FIG. 1, of a portion of the tool.

FIG. 1 shows part of a hammer drill having a housing 2 which includes a pistol grip handle 4 and a motor compartment 6. An electrical cable 8, for connection to a supply of line voltage, is connected to a trigger-switch 10 housed in the handle 4. The trigger-switch 10 has a housing 11 and an actuating trigger 12 which is squeezed inwards to energize the drill, as is well known. Within the housing 11 of the trigger-switch 10 is incorporated a double pole reversing switch 14. An elongated lever 16, contained in the housing 2, is attached by a pivot 18 to the underside of the upper wall 20 of the trigger-switch housing 11, the lever 16 being pivotal about an axis 22. At its forward end, the lever 16 is formed with an downwardly projecting pin 24 which engages in a cavity 26 in a slide member 28. The slide member 28 has a pair of grooves 30 which slidably engage tracks 32 formed by reduced edges of a transverse arcuate slot (shown in FIG. 2) formed in the lower wall 34 of the motor compartment 6. Between the pin 24 and the pivot 18, the lever 16 has a downwardly extending pin-like protrusion 36 which engages in the top of the trigger 12. In FIG. 1, the protrusion 36 can be seen abutting a rearwardly facing edge 38 of a partition 40 in a hollow upper part of the trigger 12, and in this position the trigger 12 is rendered inoperative with the protrusion 36 functioning as a stop member, as will be described more fully in relation to FIG. 3. Rearwardly extending from the pivotal axis 22, the lever 16 has a short portion 42 which is connected to the reversing switch 14 for actuation thereof when the lever 16 is pivotally moved. Any suitable double pole reversing switch capable of being operated in this way can be employed as reversing switch 14. By way of example, one such reversing switch is shown and described in German Utility Model (Gebrauchsmuster) 78 26 545 of J. & J. Marquardt, which is hereby incorporated by reference. In the motor compartment 6, mounted in clam shell fashion, is an electric motor 44 having a pair of field coils (only the ends of one coil 46 can be seen in FIG. 1), and an armature shaft 48 which can be seen extending forwardly from the motor compartment 6 to function as a drive draft for the drill. A forward compartment of the drill containing percussion mechanism in known manner, has been omitted for simplicity, but would be attached to the forward end 50 of the motor compartment 6. The rear end of the armature shaft 48 is mounted in a bearing 52 forwardly of which the shaft 48 is formed with a commutator 54. A brush-board assembly 56 is rotatably mounted in the motor compartment 6 for limited angular movement about the axis of rotation of the armature shaft 48, as will be described more fully later. The brush-board assembly 56 has a brush-board 58, which includes a printed circuit (not shown), and has connection terminals 60, a pair of diametrically opposed brush holders 62 housing carbon brushes 64 which are resiliently urged into contact with the commutator 54. The housings of the brush holders 62 are made of insulating plastics material and have extending from them in the forward direction stud-like projections 66,67. Adjacent its forward end, the lever 16 is formed with an upwardly disposed member 68, the upper end of which is formed as a fork which engages the stud-like projection 66 of the lower brush holder 62. The member 68 is strengthened by a web 70 which extends therefrom to the forward end of the lever 16. Four field coil terminals 72 (only two of which can be seen in FIG. 1) extend rearwardly from the field coils in a location adjacent the path of rotation of the studs 66 and 67, and by making these studs and the housings of the brush holders 62 from insulating plastics material, any risk of an electrical short between the field coil terminals 72 and the studs 66,67 and the brush holders 62 is avoided.

FIG. 2 shows the arcuate slot 74 in the lower wall 34 of the motor compartment 6 with the slide 28 mounted on the tracks 32. As can be seen, the arcuate slot 74 is symmetrically disposed transversely to the longitudinal axis of the drill and is located forward of but adjacent the trigger 12.

Figure 3:
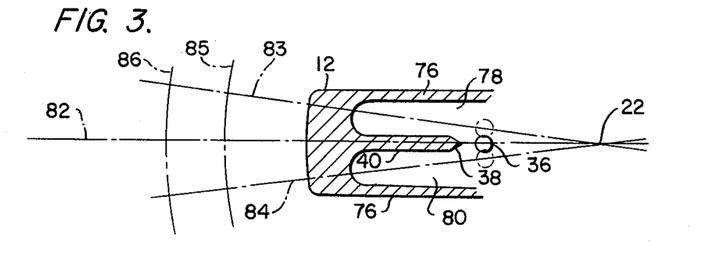
FIG. 3 is a section on the line 3—3 in FIG. 1.

FIG. 3 illustrates how the downwardly extending protrusion 36 of the lever 16 interrelates with the trigger 12. The upper part of the trigger 12 has rearwardly extending thin side walls 76 with the rearwardly extending shorter partition 40 centrally disposed therebetween to form two grooves 78 and 80. With the lever 16 of FIG. 1 in a central neutral position, the protrusion 36 lies in a central plane 82 of the drill, and in this position it functions as a stop member in conjunction with the rearwardly facing edge 38 of the partition 40 to render the trigger 12 inoperative, and prevent it being squeezed into the trigger-switch to turn the switch on to energize the drill. When the slide 28 in FIG. 2 is moved to the top extreme end of the groove 74, the pin-like protrusion 36 is moved to the position shown in phantom in FIG. 3 where it lies in the plane 83. In this position the trigger 12 can now be squeezed to actuate the trigger-switch with the pin-like protrusion 36 sliding in the groove 78. When this occurs, the partition 40 interacts with the protrusion 36 to prevent it from being moved back towards the central position until the trigger 12 is released and the tool de-energized. When the slide 28 is moved to the lower extreme end of the slot 74 in FIG. 2, the protrusion 36 is moved to lie in the plane 84. During such movements, the arc of movement of the forked member 68 is indicated at 85, and the arc of movement of the slide 28 is indicated at 86. The rearwardly facing edge 38 is formed as a knife edge, so that once the slide 28 is actuated by an operator's finger to start movement away from the central plane 82, the knife-like edge 38 aids and can complete such movement when the trigger 12 is squeezed. However, before the pin-like protrusion 36 will allow the knife edge 38 to pass, the lever 16 must be pivoted about the axis 22 sufficiently for the short rearwardly extending part 42 to actuate the reversing switch 14 to determine the direction of rotation of the motor. The combination of the protrusion 36 on the reversing lever 16 and the partition 40 forming grooves 78 and 80 in the retractable trigger 12 thus constitutes an interlocking means between the lever and the trigger, precluding actuation of the lever in the "on" position of the switch.

Figures 4, 5, 6:
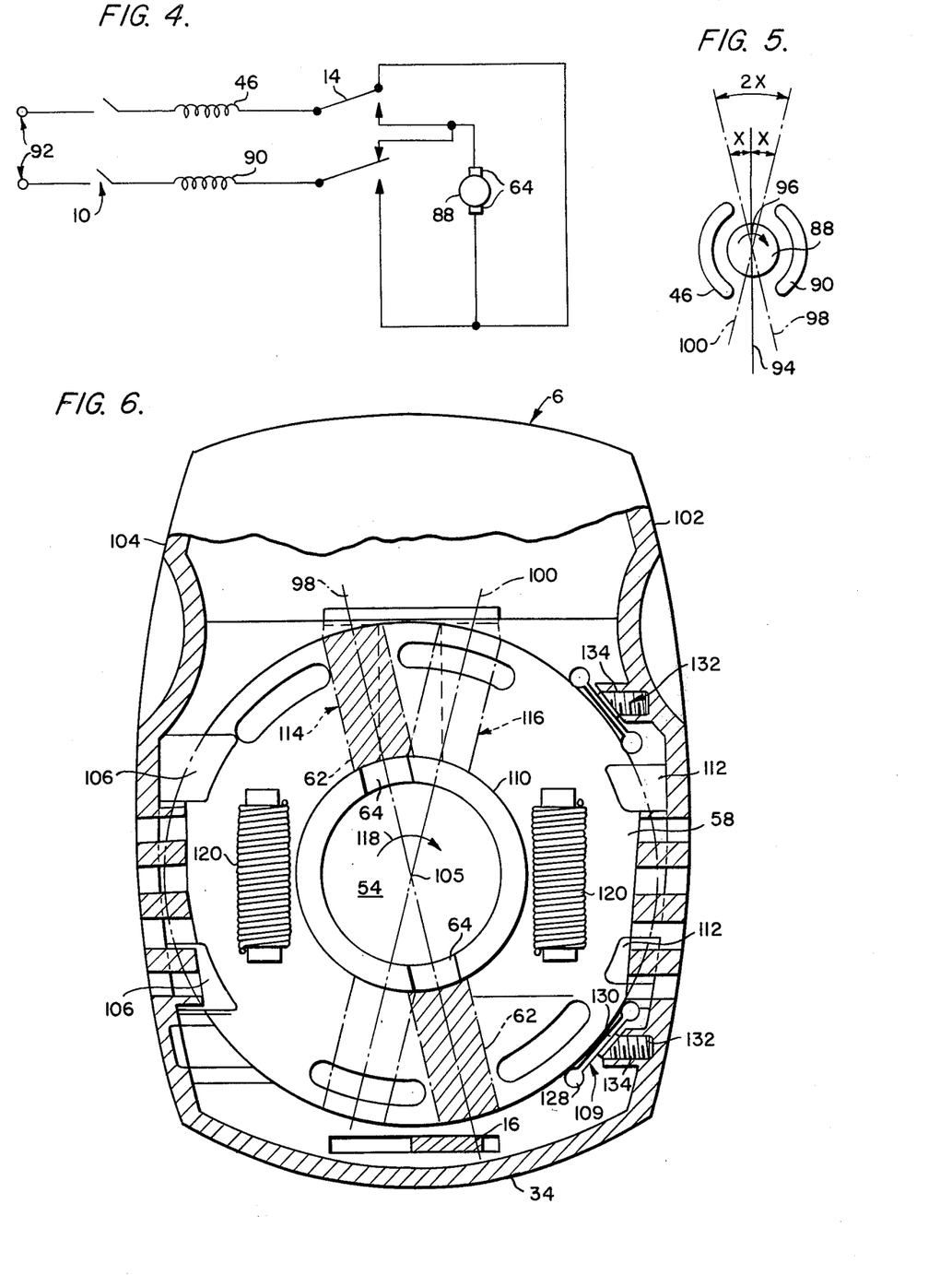
FIG. 4 is a schematic circuit diagram.
FIG. 5 schematically illustrates brush-shifting.
FIG. 6 is a diagrammatic section on the line 6—6 in FIG. 1.

FIG. 4 shows an electrical schematic diagram of how the trigger-switch 10 and the reversing switch 14 contained therein are wired to the electric motor. Line voltage applied across 92 is connected to the double pole trigger-switch 10, and thence through the two field coils 46 and 90 of the motor to the double pole reversing switch 14, and is then applied across the armature 88 of the motor via the brushes 64. The reversing switch 14 changes the direction of rotation of the armature 88 by changing the direction of the electrical supply to the brushes 64.

FIG. 5 schematically depicts brush-shifting. The mechanical neutral of the electric motor is identified by the plane 94 which lies centered between the two field coils 46 and 90. When the armature 88 operates in the clockwise direction, as indicated by arrow 96, the electrical neutral will take on a position which can be anywhere between 10 to 40 degrees away from the mechanical neutral 94 depending upon the operating characteristics of the motor, and is represented in FIG. 5 by the plane identified by the reference numeral 98. The electric motor will provide optimum performance if the brushes are disposed on the electrical neutral. When the motor is operated in the opposite direction of rotation, the electrical neutral will shift to take on the position represented by the plane 100. The planes 98 and 100 make equal angles x with the mechanical neutral plane 94, but on opposite sides thereof. Thus, to obtain optimum motor performance in each direction of rotation, it is necessary to rotate the brushes through an angle of 2x each time the direction of rotation of the motor is to be changed. The brush-shifting arrangement in the drill at present being described will now be described in greater detail.

In FIG. 6, reference numeral 102 designates the right-half clam shell of the motor compartment 6, and reference numeral 104 designates the left-half clam shell of the motor compartment. The clam shell 104 is provided with two bearing projections 106 which extend inwardly into the interior of the motor compartment and constitute bearing locations for slidably receiving the periphery of the brush-board 58. The brush-board 58 is a disc-like member having a centroidal axis 105 perpendicular to the plane of FIG. 6. The brush-board 58 is resiliently held against the bearings 106 with the aid of a pair of resilient means 132 which resiliently urge the brush-board 58 into engagement with and against the bearings 106, as will be described later in greater detail with reference to FIG. 9. The brush-board 58 has a central circular aperture 110 for accommodating the commutator 54 of the armature. The brush-board 58 is held between the bearings 106 and the pair of resilient means 132 so that it can be rotated about its centroidal axis 105 a predetermined angular displacement. An additional pair of bearings 112, inwardly extending from the other clamshell 102, coact with the pair of bearings 106 to ensure rotation of the brush holder 58 without displacement of the latter in the direction of the longitudinal axis of the motor. The pair of brush holders 62 mounted on the brush-board 58 are shown in phantom outline 114 because they are mounted on the opposite side of the board. They are also shown cross-hatched so that they can be seen more clearly. The brushes 64 are shown in engagement with the commutating surface of the commutator 54. There are only two brush holders 62, and phantom outline 114 shows the brush holders 62 in a first angular position, and reference numeral 116 designates the phantom outline showing the brush holders 62 after they have been rotated to a second angular position. These two positions for the brush holders 62 correspond to the position the brushes occupy to achieve optimum motor performance when the armature 54 is rotated in the clockwise direction of the arrow 118 and in the counterclockwise direction, respectively. Stated otherwise, by placing the brushes, for example, in the position represented by phantom outline 114, they are on the electrical neutral plane for rotation in the clockwise direction, and when the brush-board 58 is rotated about its centroidal axis 105 to the position identified by reference numeral 116, they are in the electrical neutral plane to achieve optimum electrical performance of the motor when it is rotated in the counterclockwise direction. Two choke coils 120, utilized for noise suppression, are mounted on the brush-board 58. The coils 120 are connected to the brushes 64 and other terminals by a printed circuit (not shown) formed on the brush-board 58. Attention is drawn to the lever 16, just above the lower wall 34 of the motor compartment 6, which effects the rotation of the brush-board 58 to accomplish brush-shifting between positions 114 and 116.

Figure 7:
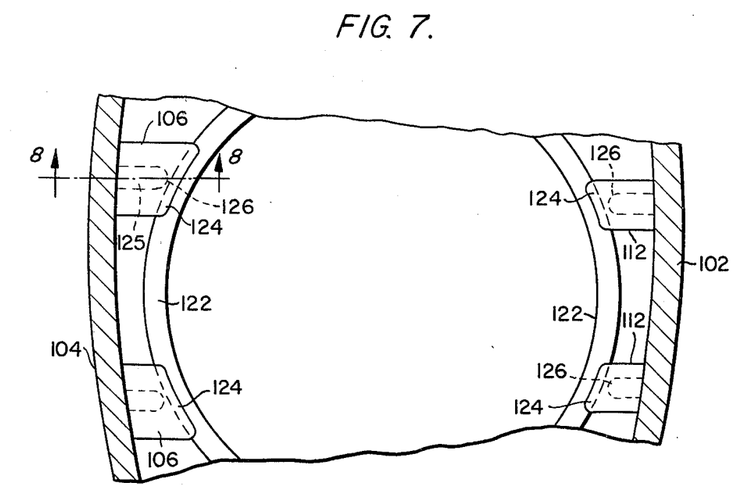
FIG. 7 is a diagrammatic section on the line 7—7 in FIG. 1 with parts omitted for clarity.

FIG. 7 is a similar view to FIG. 6, but taken on the section line 7—7 in FIG. 1 and with many parts omitted to more clearly show the engagement of the periphery 122 of the brush-board in the pairs of bearings 106 and 112. Each bearing has a central portion 125 with a curved inwardly facing bearing surface 126. Each bearing also has at its inner end, an inwardly facing arcuate groove 124, the periphery 122 of the brush-board slidably engaging in the grooves 124 and bearing against the curved bearing surfaces 126. The pair of resilient members 132 (shown in FIG. 6) urge the brush-board to the left in FIG. 7 to ensure that the outer edge of the brush-board's periphery 122 stays in contact with the bearing surfaces 126 of the two bearing members 106. As can be just seen in FIG. 7, this causes the outer extreme surface of the brush-board's periphery 122 to move slightly to the left in FIG. 7 to just come out of contact with the curved bearing surfaces 126 of the pair of bearing members 112. This allows any tolerance variations between the extreme outer edge of the brush-board's periphery 122 and the location of the four bearing surfaces 126 to be accommodated and not impair easy rotational movement of the brush-board.

Figures 8, 9, 10:
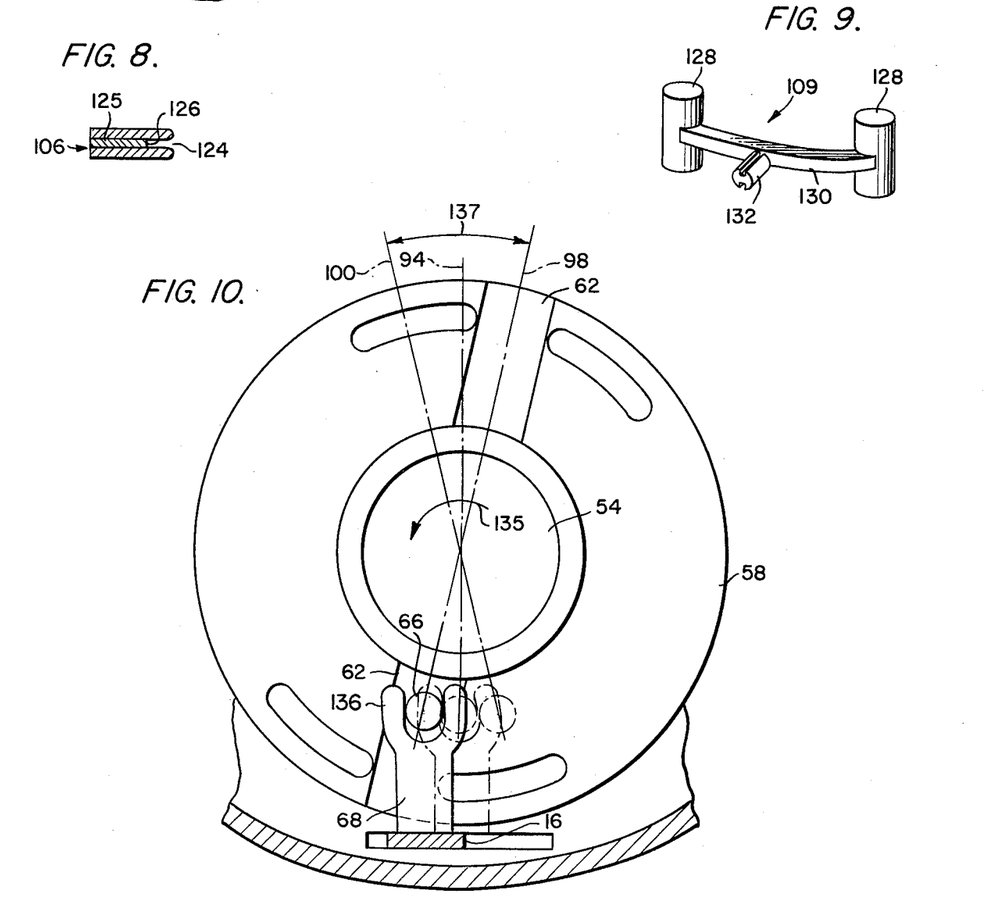
FIG. 8 is a section on the line 8—8 in FIG. 7.
FIG. 9 is a perspective view of a component.
FIG. 10 is a diagrammatic section on the line 10—10 in FIG. 1 with parts omitted for clarity.

FIG. 8 is a section on the line 8—8 in FIG. 7 through one of the bearing members 106, but typically represents a section through each of the four bearing members. The groove 124 can be more clearly seen, as can the central part 125 terminating inwardly at the bearing surface 126.

FIG. 9 shows a perspective view of one of the resilient means 109 and should be viewed in conjunction with FIG. 6. Each resilient means has a pair of cylindrical parts 128 connected by an outwardly bowed connecting part 130 from the center of which outwardly extends a cylindrical anchor member 132. The complete member 109 is molded from resilient plastics material, and the bowed connecting part 130 resiliently resists being straightened. The outwardly extending anchor member 132 is screwed into an internally screw-threaded bore 134 formed in the righthand clam shell 102 of the motor compartment. The cylindrical surfaces of the cylindrical parts 128 bear against the extreme outer peripheral edge of the brush-board 58, causing the bowed connecting part 130 to be straightened, and causing the cylindrical anchor member 132 to bend at an angle to its central axis adjacent its connection to the connecting member 130, as can be seen in FIG. 6. Due to the resilient nature of the members 109, the straightened connecting part 130 is trying to recover to a bowed shape and the bent anchor part 132 is trying to recover to being straight, so resiliently creating forces to urge the brush-board 58 to the left in FIG. 6.

FIG. 10 is a section on the line 10—10 in FIG. 1 with many parts omitted to more clearly show the brush-shifting operation. With the armature 54 rotating in the direction of the arrow 135, the brush holders 62 are disposed on the electrical neutral plane 98. This is the same plane 98 as shown in FIGS. 5 and 6. The arm-like member 68 extending upwardly from the lever 16 has formed at its upper end a fork 136 which slidably and rotatably engages the stud-like projection 66 of the lower brush-holder 62. To achieve this position, as viewed in FIG. 2, the slide 28 has been moved to the extreme lower end of the arcuate slot 74. When it is desired to reverse the direction of rotation of the motor, the lever 16 is pivoted towards and through the central mechanical neutral plane 94, and then to the right of that plane, as viewed in FIG. 10, until the brush-holders 62 have been rotated through the angle 2x to the now electrical neutral plane 100. To help understand this movement, the fork member 136 and the stud 66 are shown in phantom as they pass through the mechanical neutral plane 94, and the stud 66 only is again shown in phantom when it has reached the plane 100. In this particular embodiment the angle 2x through which the plane of the brushes passes as shown by arrow 137, when moving between the two electrical neutral planes 98, 100, is approximately 39 degrees.

Now summarizing the operation of the portable electric tool, an operator grasps the pistol grip handle 4 in one hand, and first moves the slide 28 with a finger or thumb of that hand from the central position shown in FIG. 2 to one of the ends of the slot 74. In so doing, the lever 16 is pivoted about its axis 22, which is substantially at right angles to the axis of rotation of the armature, so actuating the reversing switch 14 for the chosen direction of rotation of the motor, and simultaneously moving the downwardly extending pin-like protrusion 36 into register with one or other of the grooves 78,80 in the trigger 12 (see FIG. 3), and simultaneously causing the forked member 68 of the lever 16 to rotate the brush-board assembly 56 to position the brushes 62 on either the electrical neutral plane 98 or 100, depending upon the direction of rotation of the motor chosen. The trigger 12 is now squeezed inwardly by the index finger of the operator to actuate the trigger-switch 10 and energize the motor 44. During this inward squeezing of the trigger 12, the pin-like protrusion 36 slides into one of the grooves 78,80 in the trigger. As long as the trigger 12 is held inwardly actuating the trigger-switch 10, the central partition 40 in the trigger prevents the pin-like protrusion 36 from moving; thus, if while the motor is energized, the operator tries to move the slide 28 to another position, the interreaction between the pin-like protrusion 36 and the central partition 40 of the trigger prevents him from doing so. Before the direction of rotation of the motor can be reversed, the operator must first release the trigger 12 to de-energize the motor, and then actuate the slide 28 to pivot the lever 16 to the opposite position. The pin-like protrusion 36 will then register with the opposite groove 78 or 80 in the trigger 10, so allowing the trigger again to be inwardly squeezed to energize the motor, brush-shifting and actuation of reversing switch 14 having been completed before the trigger 12 can activate the switch 10 to energize the motor.

It should be noted that by locating the elongated lever 16 completely in the tool housing 2, the trigger 12 can be located immediately adjacent the lower wall 34 of the motor compartment 6, which is the most comfortable position for it to be operated by the index finger of the operator. Also, the slide 28 has been located just forward of, but adjacent to, the trigger 12 in a position in which the operator can easily actuate the slide 28 in either direction by using either the thumb or a finger of the hand grasping the pistol grip handle 4. Further, by incorporating the lever 16 inside the tool housing 2, the risk of dirt or chippings becoming lodged between the lever and the lower wall 34 of the motor compartment 6, to which the lever 16 is in close proximity, and affecting the free operation of the lever 16, is virtually eliminated. In fact, the trigger-switch and lever arrangement disclosed, leaves very little space through which dirt or chippings could penetrate the inside of the tool casing 2. In this respect, the arcuate slot 74 can be arranged to be completedly covered by the slide 28 if desired. The slide 28 would then be formed as an arcuately shaped member and being on the outside longer than the slot 74 by an amount equal to twice the travel of the slide 28 engaging in the slot 74. The inner part of the slide 28, engaging the track-like edges 30,32, would have the same dimensions as shown. In other words, when the slide 28 is in the central position shown in FIG. 2, it would cover the slot 74, and extend past it on each side by an amount equal to the distance the slide 28 has to travel in moving from the central position to either extreme operating position to effect the brush-shifting.

It should also be noted that with the lever arrangement disclosed, brush-shifting and actuation of the reversing switch can simultaneously be effected in a very simple way with only one operating part, the lever 16, which takes up very little space in the motor compartment, and is simple to manufacture and assemble. Also, by locating the pivotal axis 22 of the lever adjacent the reversing switch with a substantially longer part of the lever 16 on the other side of axis 22 being arranged to effect the brush-shifting, the brush-board assembly 50 can be rotated through the necessary angle while the reversing switch is subjected to only a small angle of actuation.

Figure 11:
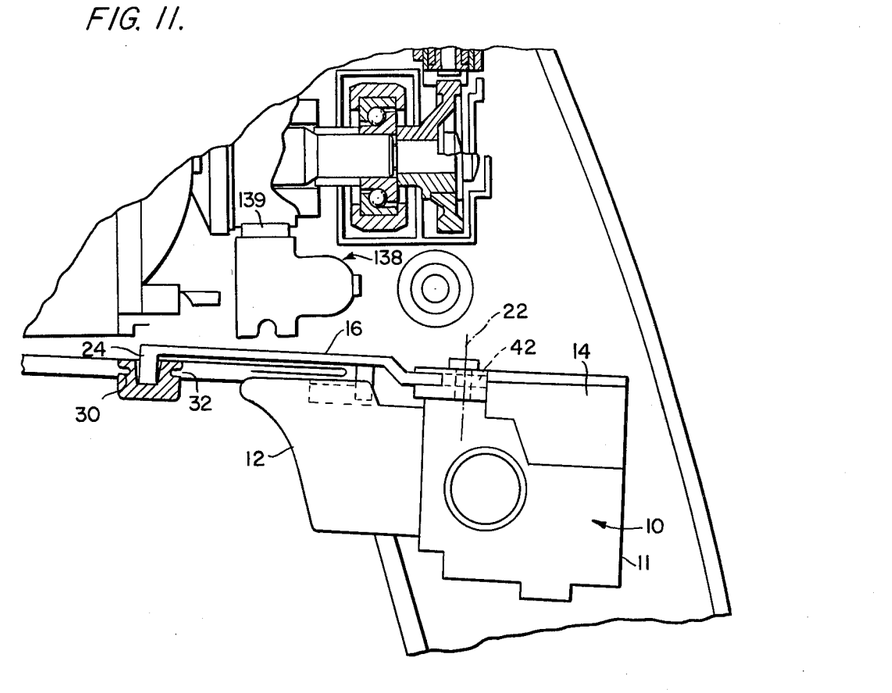
FIG. 11 is a diagrammatic vertical section of part of a portable tool incorporating another embodiment of the invention.

FIG. 11 shows a modification of the portable electric tool just described. In this modification the electric motor is not equipped with brush-shifting mechanism. However, it is equipped with the same trigger-switch 10 incorporating the motor reversing switch 14 which is actuated by the slide 28 via the pivoted lever 16. The lever 16 does not have the web 70 nor the upwardly extending forked member 68 shown in FIG. 1. In other respects, the lever 16 is exactly the same as that previously shown and described and is operated by the slide 28 to pivot about the axis 22 to actuate the reversing switch 14. The downwardly extending projection 36 coacts with the partition 40, and the grooves each side thereof in the trigger 12, so that the trigger 12 is rendered inoperative until the lever 16 is pivoted from its central position to actuate the reversing switch 14. Thereafter, when the trigger 12 is squeezed to actuate the switch 10, the lever 16 cannot be pivotally moved again until the trigger 12 is released. This trigger-switch plus reversing switch arrangement has the same advantages concerning ease and comfort of operation, and substantial reduction or elimination of egress of dirt and chippings, as described above.

Figure 12:
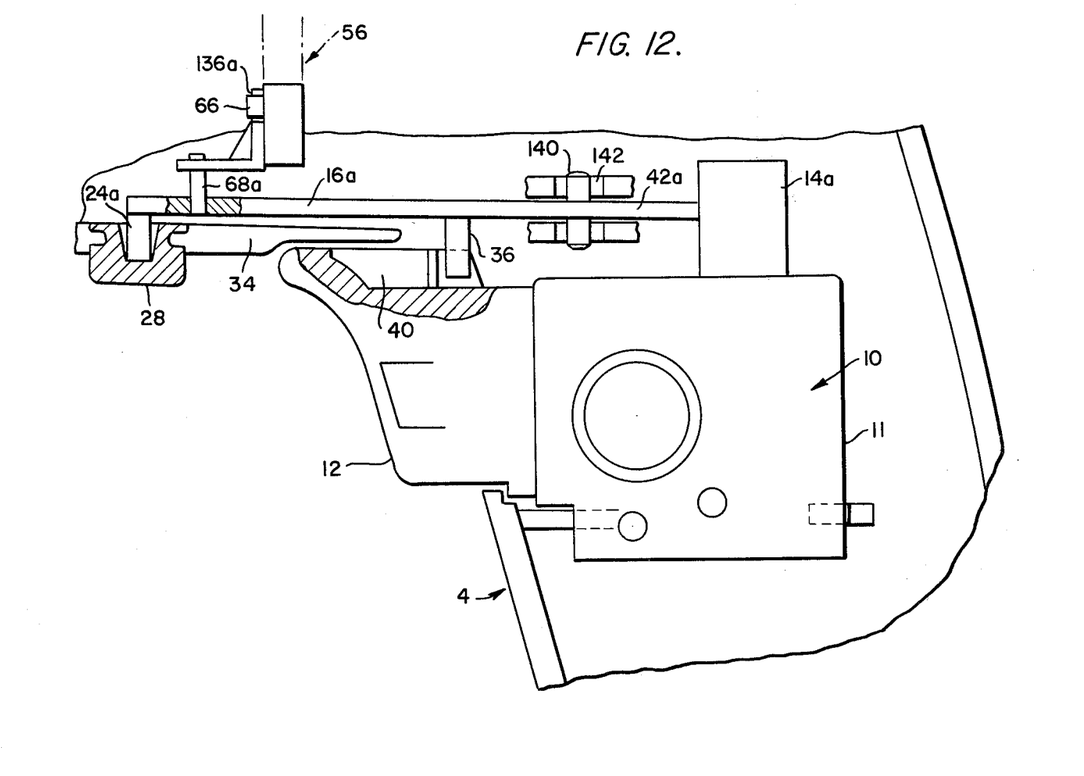
FIG. 12 is a schematic vertical section of part of a portable tool showing yet another embodiment of the invention.

FIG. 12 shows a further modification. This modification is identical in most respects to that shown and described in relation to FIGS. 1 through 10, and like parts are designated by the same reference numerals. The parts that are modified are designated by the same reference numerals as are used in FIG. 1, but with the addition of a suffix a. The reversing switch 14a is mounted on the top of the housing 11 of the trigger-switch 10. The elongated lever 16a has a pivot 140 which is pivotally mounted in a bracket 142 in the motor compartment above the housing 11 of the trigger-switch. The short rearwardly extending end 42a of the lever 16a extends into the reversing switch 14a for actuation thereof as previously described. The lever 16a has the downwardly extending protrusion 36 which interacts as previously described with the partition 40 of the trigger 12. The forward end of the elongated lever 16a is formed with a downwardly extending pin 24a, similar to that in FIG. 1, and engaging the slide 28 as previously described. The upwardly extending member 68a is forked at its upper end and engages the stud 66 as previously described, but does not have the web 70. The brush-board assembly 56 is identical to that previously described and for simplicity has been shown in FIG. 12 as a schematic representation. This modification operates identically to the portable electric tool described in relation to FIGS. 1 through 10, however, it illustrates how the elongated lever 16a can be conveniently pivoted in the motor compartment independently of the trigger-switch 10 and the reversing switch 14a.

The above described embodiments, of course, are not to be construed as limiting the breadth of the present invention. Modifications, and other alternative constructions will be apparent which are within the spirit and scope of the invention as defined in the appended claims.

What is claimed is:

1. A portable tool having an electric motor, comprising:
    an armature;
    a rotatable brush-board having brushes mounted thereon;
    a reversing switch for determining the direction of rotation of the armature; and
    a pivoted lever mechanically coupling the brush-board to the reversing switch whereby pivotal movement of the lever angularly shifts the brushes about the axis of rotation of the armature and simultaneously actuates the reversing switch to determine the direction of rotation of the armature.

2. The portable tool recited in claim 1, comprising a main switch for energizing the tool, and wherein said reversing switch is housed with said main switch.

3. The portable tool recited in claim 2, wherein said lever is pivoted to said main switch.

4. The portable tool recited in claim 3, comprising a motor compartment housing an electric motor, and wherein one end of said lever is situated within said motor compartment where it is mechanically coupled to said brush-board.

5. A portable tool having an electric motor, comprising:
   an armature;
   a rotatable brush-board assembly having motor brushes mounted thereon;
   a trigger-switch for energizing the tool and incorporating a reversing switch for determining the direction of rotation of the armature;
   an elongated pivoted lever mechanically coupling the brush-board assembly to the trigger-switch whereby pivotal movement of the lever angularly shifts the brushes about the axis of rotation of the armature and simultaneously actuates the reversing switch to determine the direction of rotation of the armature.

6. The portable tool recited in claim 5, comprising a housing for the tool, and wherein said lever is disposed within said housing.

7. The portable tool as recited in claim 6, wherein said lever is pivoted intermediate its length about an axis which is closer to said lever's coupling to said reversing switch than its coupling to said brush-board assembly.

8. The portable tool recited in claim 5 or 7, wherein said lever has stop means which engages and cooperates with the trigger of said trigger-switch in such a way that said lever can only be pivotally moved when said trigger-switch is not energizing the motor.

9. A portable tool, comprising:
   a housing having a handle;
   a motor in said housing having field coils which have a mechanical neutral plane, an armature, and a brush-board assembly which carries a pair of brushes and is rotatable about the axis of rotation of the armature for angularly shifting said brushes with respect to the mechanical neutral plane of said field coils;
   a main switch housed in said handle for energizing the tool and incorporating a reversing switch for determining the direction of rotation of the armature;
   an elongated lever disposed within said housing and pivoted intermediate its length with one end coupled to said reversing switch and the other end coupled to said brush-board assembly; and
   means accessible from the exterior of said housing for pivoting said lever whereby pivotal movement of said lever angularly shifts the brushes with respect to the mechanical neutral of the field coils and simultaneously actuates the reversing switch to determine the direction of rotation of the armature.

10. The portable tool recited in claim 9, wherein said lever is pivoted about an axis substantially at right angles and intersecting the axis of rotation of the armature.

11. The portable tool recited in claim 10, wherein said lever is pivoted adjacent said reversing switch, and has a fork at said other end which engages said brush-board assembly.

12. The portable tool recited in claim 9, wherein said lever is pivoted within said housing above said main switch.

13. The portable tool recited in claim 9, wherein said housing has a transverse slot therein below the motor and in the vicinity of said main switch, and said lever pivoting means comprises a member slidably mounted in said slot and connected to said lever.

14. A portable tool, comprising:
   a housing having a motor compartment and a handle;
   a motor in said motor compartment having field coils and an armature;
   a brush-board assembly in said motor compartment having an annular board, a pair of brushes, and being rotatable about the axis of rotation of the armature for angularly shifting said brushes with respect to said field coils;
   a trigger-operated switch housed in said handle for energizing the motor;
   a reversing switch contained in said housing for determining the direction of rotation of the armature;
   an elongated member disposed within said housing and pivoted intermediate its length, and being coupled to said reversing switch and to said brush-board assembly, and having a part which engages and cooperates with the trigger of said trigger-switch in such a way that said elongated member can only be pivotally moved when said trigger-switch is not energizing the motor;
   means accessible from the exterior of said motor compartment for pivoting said elongated member whereby pivotal movement of said member angularly shifts the brushes with respect to the field coils and simultaneously actuates the reversing switch to determine the direction of rotation of the armature;
   bearing members extending inwardly from the wall of said motor compartment and slidably engaging the periphery of said annular board whereby said brush-board assembly is rotatably mounted.

15. The portable tool recited in claim 14, comprising resilient means acting upon the periphery of said annular board to urge it in a direction transversely to said axis of rotation of the armature to compensate for any tolerance variation between the periphery of said annular board and said bearing members.

16. A portable tool, comprising:
   a housing having a handle and a compartment extending forwardly of the handle, said compartment having a lower wall with an aperture therein;
   a trigger-operated switch housed in said handle for energizing the tool and having the trigger extending forwardly from said handle closely adjacent said lower wall of said compartment;
   an elongated pivoted lever, for actuating a function of the tool, arranged within said housing and having a stop member cooperating with said trigger whereby said lever can only be pivotally moved to actuate said function when said trigger-switch is in an off-position to de-energize the tool; and
   an actuating member movable in said aperture transversely of said elongated lever, and being connected to said lever for effecting pivotal movement thereof.

17. The portable tool recited in claim 16, wherein said trigger has a partition having a rearwardly facing edge and a groove on each side of said partition, said stop member engaging said rearwardly facing edge when said lever is in a neutral position and the trigger is in the off position, and said stop member slidably engaging one of said grooves when said lever is pivotally moved to actuate said function.

18. The portable tool recited in claim 16, wherein said aperture is a slot disposed transversely of said elongated lever, and said actuating member comprises a slide slidably mounted in said slot.

19. The portable tool recited in claim 18, further comprising an armature, and a reversing switch for determining the direction of rotation of the armature, and wherein said lever is pivoted intermediate its length, one end of said lever engaging said reversing switch for actuation thereof, and the other end being connected to said slide.

20. A portable tool, comprising:
an electric motor;
a housing having a handle, and a compartment extending forwardly of the handle and having a lower wall with an aperture therein;
a trigger-operated switch housed in said handle for energizing the motor and having the trigger extending forwardly from said handle adjacent said lower wall with two grooves in the top of the trigger;
a reversing switch incorporated in said trigger switch for determining the direction of rotation of the motor;
an elongated member pivoted adjacent one end to said trigger-switch, being connected at said one end to said reversing switch for actuation thereof, being disposed within said housing, having a protrusion extending into said trigger for slidable engagement with said grooves, and extending forwardly in said compartment beyond said trigger;
an actuating member movable in said aperture transversely of said elongated member, and being connected to said elongated member forwardly of said trigger for pivotally moving said elongated member;
whereby when said lever is pivotally moved to either of two positions to enable said protrusion to engage one or other of said grooves, said lever actuates said reversing switch to determine the direction of rotation of the armature, and once one of said grooves is so engaged said lever can only be pivotally moved again when said trigger is in an off-position to de-energize the motor.

21. The portable tool recited in claim 20, wherein said aperture is an arcuate slot, and said actuating member slidably engages in said slot and has a recess which is engaged by the other end of said elongated member.

22. A portable tool, comprising:
a housing having a pistol grip handle depending therefrom and a motor compartment, the latter extending forwardly of said handle and having a lower wall;
an electric motor mounted in the motor compartment;
a trigger-switch in said handle for energizing the motor and having an actuating trigger below and immediately adjacent said lower wall;
an elongated pivoted lever, for actuating a function of the tool, disposed completely within said housing, the forward portion of said lever being disposed in said motor compartment above said lower wall and terminating therein forwardly of said trigger, and said lever having a stop member cooperating with said trigger whereby said lever can only be pivotally moved to actuate said function when said trigger-switch is in an off-position to de-energize the tool;
said lower wall having a transverse slot therein at a location forwardly of said trigger; and
actuating means, connected to said lever and engaging through and movable along said slot with an actuating part extending below said lower wall forwardly of and adjacent said trigger, for actuating pivotal movement of said lever.

23. In a power tool or other portable device of the type having a housing provided with a pistol-grip handle and a trigger-operated reversing switch therein, a reversible electric motor in the housing, the motor having an armature provided with a commutator, and a brush board rotatably mounted in the housing for limited angular movement about the motor axis, the brush board having brushes engaging the commutator, the improvement which comprises, in combination, manually-manipulatable reversing means adjacent to the switch trigger, interlocking means between the reversing means and the switch trigger, precluding actuation of the reversing means in the "on" position of the switch, and means mechanically coupling the reversing means to the brush board, whereby upon actuation of the reversing means in the "off" position of the switch, the brush board rotates angularly to shift the brushes to the "reverse" electrical neutral on the opposite side of the mechanical neutral, thereby reducing sparking and excessive wear on the brushes and commutator, and thereby providing for optimum motor performance in the reverse direction of rotation.

24. In a power tool having a housing including a depending pistol-grip handle provided with a switch trigger projecting forwardly thereof, the subcombination of a brush carrier rotatably mounted in the housing for limited angular movement therein, a reversing lever between the trigger and the brush carrier and having a limited movement in a plane transverse to the plane of angular movement of the brush carrier, and means including a bifurcated fork on the reversing lever and a stud on the brush carrier and received in the fork for mechanically coupling the reversing lever to the brush carrier, whereby the brush carrier pivots angularly in response to transverse movement of the reversing lever.

* * * * *